United States Patent [19]
Taylor

[11] 3,934,255
[45] Jan. 20, 1976

[54] RECORDER PEN
[75] Inventor: Guy A. Taylor, Batavia, Ill.
[73] Assignee: Sanford Research Company, Bellwood, Ill.
[22] Filed: June 3, 1974
[21] Appl. No.: 475,957

Related U.S. Application Data
[63] Continuation of Ser. No. 392,968, Aug. 30, 1973, abandoned.

[52] U.S. Cl............................................ 346/140 A
[51] Int. Cl.².......................................... G01D 15/16
[58] Field of Search......... 346/140 R, 140 A; 403/2, 403/106, 345; 401/140

[56] References Cited
UNITED STATES PATENTS
| | | | |
|---|---|---|---|
| 1,541,950 | 6/1925 | Heesch | 346/140 |
| 1,683,828 | 9/1928 | Ireland | 346/140 |
| 3,611,430 | 10/1971 | Watchorn | 346/140 |

*Primary Examiner*—Joseph W. Hartary
*Attorney, Agent, or Firm*—Wegner, Stellman, McCord, Wiles & Wood

[57] ABSTRACT

A recorder pen having a tube or cartridge with a closed chamber and an integrally formed sleeve for supporting a linear fiber nib in writing position therein. The chamber contains a dye solution impregnated fibrous material in engaging relationship with an angled end face on the nib. An end plug is forced into the open end of the tube or cartridge for sealing the chamber and for limited compacting of the fibrous material against the angled end of the nib. Integrally formed with the cartridge are a plurality of mating channel-shaped mounting members adapted to grip the arm of a recording instrument. Web means are formed across the opening of selected mounting members which web means are partially pierced by the arm end to accommodate narrower width arms. Ridges and lugs project into the opening through the channel-shaped members and between the channel-shaped members so as to engage the flat surface of the arm to accommodate for arms of thinner dimensions.

19 Claims, 9 Drawing Figures

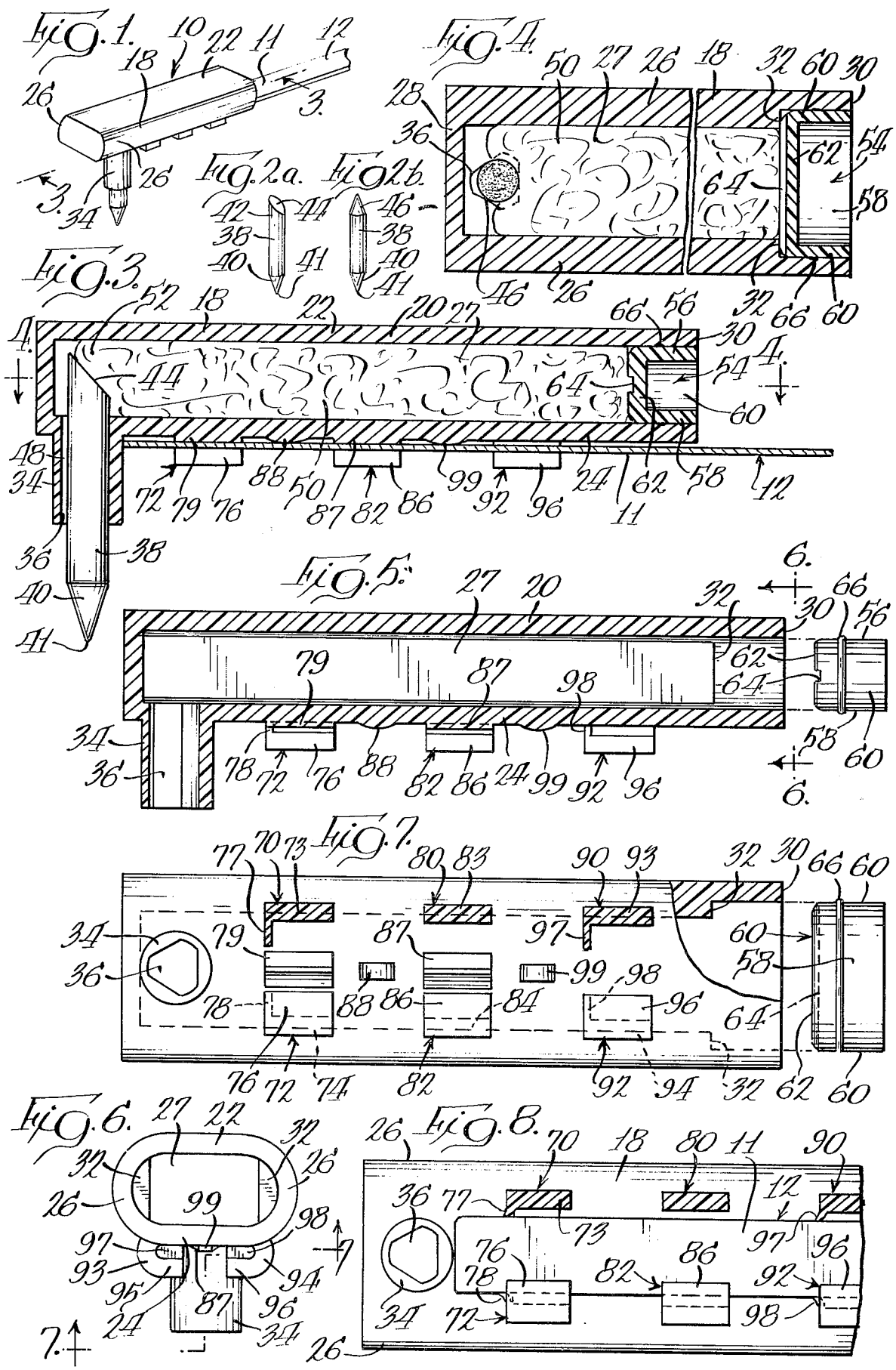

RECORDER PEN

This is a continuation, of application Ser. No. 392,968 filed Aug. 30, 1973 now abandoned.

BACKGROUND OF THE INVENTION

The present invention relates to disposable recorder pens and more particularly to recorder pens having long shelf life and long writing life as well as having novel means for attaching the pen to arms having a wide variety of lateral and thickness dimensions.

The existing disposable recorder pens have no way to adjust for use on arms having dimensions which vary from a standard size. There are some recorder pens of quite expensive and complicated construction which use special screws or provide adapters or inserts to adjust for variations from standard dimensions.

In addition, the majority of currently available recorder pens are of the metal container variety having a reservoir of liquid material which must be kept in a predetermined position in order to have capillary flow through the nib and in order to prevent the liquid from being inadvertently discharged from the pen. It is necessary to manually fill the chambers after cleaning the various components of the pen, thus adding cost to the maintenance of the instrument.

SUMMARY OF THE PRESENT INVENTION

A recorder pen is provided having a tube or cartridge with a closed chamber and a depending sleeve for supporting a linear fiber nib having an angled inner face projecting into the main portion of the chamber. Fibrous material impregnated with a dye solution is appropriately compacted into operative engagement with the angled face of the nib and is held sealed in the chamber by an end plug having sealing and retaining means between the plug and the chamber and having vent means on the inner face of the plug for venting the opposite sides of the chamber. A continuous capillary flow of fluid through the fibrous material and through the linear fibers of the nib provide a recorder pen that will operate in all positions of orientation of the cartridge and nib.

The tube or cartridge has at least an outer, an intermediate and an inner pair of mating channel-shaped mounting members formed integrally with one wall thereof. Selected pairs of said mounting members, for example, the inner and the outer pairs, have thin webs formed across the opening in each channel which webs are adapted to be selectively sheared by an arm end such that the unsheared portion serves to grip the side edges of the arm to retain the recorder pen on the arm end for use.

The wall of the tube or cartridge has ridges formed between the outer and the intermediate pairs of mounting members and has lugs formed between adjoinng pairs of mounting members, said ridges and lugs projecting into the open space between the wall of the cartridge and the supporting walls of the mounting members which ridges and lugs are adapted to engage with the flat surface of the arm end to retain the recorder pen on the arm end for use. The dimensions of the ridges and lugs are such as to accommodate for arms of varying degrees of thickness. A recorder instrument arm that is thinner or narrower than usual can be accommodated with this unique channel-shaped construction in that it will puncture through only that portion of the webs in the mounting means as is necessary to hold the arm from the side position and wherein the ridges and lugs engage with the upper surface of the arm to urge it into engaging relationship with the supporting walls of the mounting members. In this way, narrower and thinner arm ends can be provided for use with this recorder pen.

BRIEF DESCRIPTION OF THE DRAWINGS

FIG. 1 is a perspective view of my improved recorder pen in position on a recording instrument arm and oriented to write on a horizontally disposed chart;

FIG. 2a is a perspective view of a nib for use with the recorder pen of FIG. 1;

FIG. 2b is a perspective view of a modified form of nib for use with the recorder pen of FIG. 1;

FIG. 3 is an enlarged cross-sectional view taken along the lines 3—3 of FIG. 1;

FIG. 4 is a cross-sectional view taken along the lines 4—4 of FIG. 3 with a section of the middle of the instrument being eliminated for ease of illustration;

FIG. 5 is a cross-sectional view similar to FIG. 3 with the nib and fibrous materials removed and with the end plug spaced from its engaging position with the tube or cartridge;

FIG. 6 is an end view taken along the lines 6—6 of FIG. 5;

FIG. 7 is a bottom view of the tube or cartridge shown in FIG. 5 with portions of the channel-shaped mounting members and the end corner of the housing broken away and shown in cross-section; and, FIG. 8 is a partial view similar to the left-hand portion of FIG. 7 with an arm end in position in the channels to illustrate the construction and operation of the webs in the channel member.

Referring to the drawings, and, in particular, FIGS. 1 through 4, a recorder pen 10 is shown in position on one end portion 11 of a recording arm 12. The arm 12 is shown broken away but is in reality attached to a recording instrument (not shown) of conventional design wherein continuous readings of the state of some condition is transmitted to the arm 12 and pen 10 for recording on a sheet or chart (not shown).

The recorder pen 10 is comprised of a cartridge or housing 18 which can be formed by molding, extruding or the like, a linear high density polyethylene plastic material and has a body portion 20 of a cross-sectional shape which is somewhat oval in configuration having a flat top wall 22, bottom wall 24 and rounded side walls 26 forming a chamber 27 therein. The one end of the body portion 20 of the cartridge or housing 18 is shown with an end wall 28 formed integrally therewith while the other end 30 of the body portion 20 is open and has restraining ledges 32 formed in the side walls 26 and spaced axially in from the open end 30 a predetermined amount. The tube or cartridge can be formed with either end closed or with both ends open as desired. A transversely disposed sleeve 34 is formed integrally with the tube or cartridge and projects downwardly from the bottom wall 24 near the closed end 28 of the cartridge. The sleeve 34 is shown with a circular outside configuration and with an axial opening 36 which is a truncated triangle in cross section.

A nib or writing tip 38, such as shown in FIGS. 2a and 2b, is formed of any material capable of acting in a continuous capillary system for conveying writing fluid to the point and onto a surface. It has been found preferable to use a linear fiber bonded polyester material for the nib or tip 38. The writing end 40 of the nib or tip is tapered to a point 41 for scribing a line on the recording chart. The opposite or inner end 42 of the nib or tip 38 is shown in FIG. 2a cut at an angle of approximately 45° to the longitudinal axis of the nib to form a planar face 44. The angle of cut can vary many degrees from the 45° angle, however, since it is desired to have the maximum exposed surface and since the 45° angle of cut results in a maximum exposed surface, the 45° angle of cut is preferred. FIG. 2b illustrates a modified form of nib or tip with the inner end 42 of the nib or tip 38 being conically shaped at 46.

The nib or tip 38 with the angled face 44 facing away from end wall 28 and towards the major area of the chamber 27 is inserted into the opening 36 in the sleeve 34 so that the remote edge of the face 44 touches or almost touches the opposite inner wall of the cartridge, as can be seen in FIG. 4. Due to the truncated triangular opening 36 in the sleeve 34 and the circular outer surface of the nib 38, vent openings or passages 48 are provided at the three apexes of the triangle along the outer surface of the nib 38 to permit limited venting of the closed chamber 27 in the cartridge or housing 18.

An elongate wad or batting of saturable fibrous material 50 of circular and elongate configuration is compressed into a shape conforming with and slightly smaller than the shape of the chamber 27 whereupon the wad of fibrous material 50 is urged into the chamber until the inner end portions 52 of the fibrous material engages with the face 44 of the nib 16. As the fibrous material 50 is forced into the chamber, the air in front of the fibrous material is vented to the atmosphere through the vents 46 in the sleeve 34 around the nib 38.

By appropriate means such as a filler probe, a dye solution such as ink is impregnated into the fibrous material until the fibrous material is substantially saturated with the solution. A shaped end plug 54, which has an elliptical cross section matching the cross section of the opening in the open end 30 of the cartridge or housing, has a top wall 56, a bottom wall 58, end walls 60 and a front wall 62, said front wall 62 being inserted first into said open end 30 of the cartridge. The front wall 62 has a vent slot 64 formed from side-to-side along the long axis of the ellipse. A retaining bead 66 projects outwardly from around the outer surface of the plug 54.

The front wall 62 of the plug 54 is aligned with and forced into the open end 30 of the cartridge or housing and will compact and force the impregnated wad of fibrous material 50 forward in the chamber 27 so that the end portion 52 of the fibrous material will be forced around and slightly beyond the end portion 42 and angled face 44 of the nib 38. Only a limited amount of compacting of the fibrous material 50 is desired and this is accomplished by means of the edges of the front wall 62 of the plug 54 engaging with the restraining ledges 32 formed in the side walls 26 of the chamber. The retaining bead 66 on the plug 54 is urged in deforming and nesting relationship into the walls of the cartridge or housing so as to seal the plug 54 with respect to the cartridge and thereby seal the dye impregnated fibrous material in the chamber. The slot 64 in the front wall 62 of the plug 54 forms a vent passage between the opposite sides of the chamber to equalize the pressure between the sides of the chamber thereby preventing a pressure block from forming in the chamber. The plug 54 may be put in either end of the cartridge 18 or in both ends as desired.

Integrally formed with the bottom wall 24 of the tube or cartridge 18 are a plurality of pairs of spaced and mating channel-shaped arm mounting members 70–72, 80–82 and 90–92. The outermost pair of mounting members 70–72 have depending walls 73, 74 and support walls 75, 76, respectively, with the depending walls 73, 74 spaced from each other and with the support walls 75, 76 spaced from the bottom wall 24 of the tube or cartridge 18 to form an opening therebetween. The facing edges of the support walls 75, 76 are spaced from each other an amount considerably less than the spacing between walls 73, 74. Webs 77, 78 are formed on the leading edges of the mounting members 70, 72 and extend between the support walls 75, 76 and bottom wall 24 and from the depending walls 73, 74 to the facing edges of said support walls 75, 76 so as to obstruct the passageway through the opening in the channel-shaped mounting members 70, 72. A ridge 79 is formed centrally between the pair of channel-shaped mounting members 70, 72 and projects down from the bottom wall 24 of the tube or cartridge or housing into the opening defined by the support walls 75, 76 of the mounting members 70, 72 and the bottom wall 24 of the cartridge to limit the cross-sectional size of said opening.

The intermediate pair of channel-shaped mounting members 80, 82 have depending walls 83, 84 and support walls 85, 86 with the depending walls 83, 84 being spaced from each other an amount substantially equal to the spacing of the depending walls 73, 74 of the previously described mounting members 70, 72 and with the support walls 85, 86 spaced from the bottom wall 24 of the cartridge an amount equal to the comparable spacing in mounting members 70, 72. A ridge 87 is formed centrally between the mounting members 80, 82 and projects from the bottom wall 24 of the cartridge into the opening defined by the support walls 85, 86 and the wall 24 of the cartridge to limit the cross-sectional size of said opening. The innermost pair of channel-shaped mounting members 90, 92 is formed substantially the same as the outermost pair 70, 72 and has a pair of depending walls 93, 94 with a pair of support walls 95, 96 spaced from the bottom wall 24 of the cartridge. Webs 97, 98 are formed on the leading edges of mounting members 90, 92 and between the support walls 93, 94 and the bottom wall 24 and extend from the depending walls 93, 94 to the edges of the support walls 93, 94 so as to obstruct the passageway through the opening in the channel-shaped mounting members 90, 92.

Between the outer pair of mounting members 70, 72 and the intermediate pair of mounting members 80, 82, a lug 88 is formed on the bottom wall 24 of the cartridge 18 centrally with respect to the openings in the respective mounting members in such a way as to restrict the opening between the bottom wall 24 of the cartridge and the support walls 75, 76, 85, 886 of the mounting members 70, 72, 80, 82. Similarly, between the intermediate mounting members 80, 82 and the inner mounting members 90, 92, a similar lug 99 is formed on the bottom wall 24 of the cartridge and projects into the opening between the support walls 85, 86, 95, 96 of the mounting members 80, 82, 90, 92 to restrict the opening between the bottom wall 24 of the cartridge and the support walls of the mounting members.

When the end of the arm of a recording instrument is to be assembled with the recording pen, the inner pair of channel-shaped mounting members 90, 92 is aligned with the end 11 and the arm 12 and is moved longitudinally along the axis of the arm with the arm passing from mounting member to mounting member until it engages with the sleeve 34. Depending upon the width of the end of the arm, the snugness of the fit between the mounting members and the arm will vary. That is, the end of the arm 12 will pierce the webs 97, 98 in the inner mounting members 90, 92 and the webs 77, 78 in the outer mounting members 70, 72 by an amount sufficient to be equal to the width of the arm so that the remaining unpierced portion of the webs will engage the edges of the arm to hold the pen firmly and centrally positioned on the arm. After the arm passes the inner mounting members 90, 92, the top surface of the arm will engage lug 99 and as it passes through the opening in mounting members 80, 82 and 70, 72, the top surface will engage and depress ridge 87, lug 88 and ridge 79. The effect of depressing lugs 99, 88 and ridges 79, 87 is to urge the arm end against the support walls 85, 86, 95, 96 to hold the pen firmly in place on the arm. The thickness of the arm end can vary from relatively thin to relatively thick so that as it is pushed from the inner through the intermediate and outer channel-shaped mounting members, the ridges and the lugs between the channel-shaped mounting members will grip the top surface of the arm no matter how thick or thin is the material of the arm to urge it into engagement with the support wall of the channel-shaped members and thereby properly orient the point of the recording instrument with respect to the arm.

Due to the webs, the ridges and the lugs, it is possible to use arms on recording instruments that vary in width and thickness substantially from standard sizes, that is, arms that are narrower or thinner than normally specified can be used and the recording pen can be assembled therewith with complete accuracy.

Heretofore, it was necessary, in order to adjust for off standard sized arms, to have thumb screw adaptors and/or mounting arrangements whereby any thickness or width variations could be provided for by an appropriate adjustment. With such a construction, it was virtually impossible to provide recorder pens that could be disposable due to the high cost of the unit. However, with the present invention, it is possible to have a readily disposable, inexpensive recorder pen that can be used on a multiplicity of arm ends even though the arm ends vary considerably from normal as far as width and thickness dimensions are concerned.

I claim:

1. In a recorder pen for a recording instrument comprising a tube having a chamber, means for maintaining a supply of fluid in said chamber and a writing nib carried by the tube in communication with said fluid in combination with mounting means carried by said tube and having support walls spaced from said tube to provide an arm entering opening therebetween, said mounting means having web means extending into the opening between said tube and said support walls, whereby an arm end deflects a portion of said web means for securing said pen onto said arm.

2. A recorder pen as claimed in claim 1 wherein ridge means are provided on said tube and spaced from said support walls, said ridge means projecting into said opening between the tube and support walls to restrict the height of said opening whereby the arm end in said opening will be urged into contact with said support walls on said mounting means.

3. A recorder pen as claimed in claim 2 wherein said mounting means comprises inner, intermediate and outer pairs of mounting members, and said web means being formed on the inner and outer mounting members.

4. A replaceable recorder pen for a recording instrument comprising a tube having a chamber, means for maintaining a supply of fluid in said chamber, a writing nib carried by the tube in communication with said fluid, mounting means carried by said tube and having support walls spaced from said tube to provide an arm entering opening therebetween, and web means carried by the mounting means and extending into the opening between said tube and said support walls, said web means engaging with and gripping the opposite sides of an arm end whereby the web means adapts itself to variations in arm dimensions.

5. A recorder pen as claimed in claim 4 wherein ridge means are provided on said tube and spaced from said support walls, said ridge means projecting into said opening between the tube and support walls to restrict the height of said opening whereby the arm end in said opening will be urged into contact with said support walls on said mounting means.

6. In a recorder pen for a recording instrument comprising a tube having a closed chamber, means for maintaining a supply of fluid in said chamber and a writing nib carried by the tube in communication with said fluid in combination with mounting means carried by said tube and having support walls spaced from said tube to provide an arm entering opening therebetween, said mounting means having web means bridging the opening between said tube and said support walls, whereby an arm end pierces a portion of said web means for securing said pen onto said arm.

7. A recorder pen as claimed in claim 6 wherein ridge means are provided on said tube and spaced from said support walls, said ridge means projecting into said opening between the tube and support walls to restrict the height of said openings whereby the arm end in said opening will be urged into contact with said support walls on said mounting means.

8. A recorder pen as claimed in claim 7 wherein said mounting means comprises inner, intermediate and outer pairs of mounting members, and said web means being formed on the inner and outer mounting members.

9. A recorder pen as claimed in claim 8 wherein said ridge means are formed between the mounting members of both the outer and the intermediate pairs of mounting members.

10. A recorder pen as claimed in claim 9 wherein lug means are formed on the tube and project into the open space between the outer and the intermediate pairs of mounting members and between the intermediate and the inner pairs of mounting members so as to restrict the height of the opening between the support walls of the outer, intermediate and inner mounting members and the lug means.

11. A recorder pen for a recording instrument comprising a tube having a chamber closed at one end, a writing nib carried by the tube and having a passageway therethrough communicating with the inside of said chamber, a fibrous means impregnated with fluid nested in said chamber with one end in intimate contact with said nib, plug means in the open end of said tube for closing said chamber and for compacting said fibrous means, and mounting means carried by said tube for securing said pen on an arm, said mounting means comprising at least two spaced apart pairs of mounting members each pair of mounting members having a pair of support walls spaced from each other and from said tube to provide an arm entering opening between said support walls and said tube, at least one of said mounting members having web means bridging the openings between said tube and said support walls, and ridge means on said tube projecting into said openings between said support walls and said tube to restrict the height of said openings whereby an arm end pierces a portion of said web means and is urged by said ridge means into contact with said support walls to hold said pen onto said arm.

12. A recorder pen as claimed in claim 1 wherein three pairs of mounting members are provided and wherein said web means are formed on the inner and the outermost pairs of mounting members.

13. A recorder pen as claimed in claim 12 wherein said ridge means are provided in the inner and intermediate pairs of mounting members.

14. A recorder pen as claimed in claim 13 wherein lug means are formed on the tube and project into the open space between the outer and the intermediate pairs of mounting members and between the intermediate and the inner pairs of mounting members so as to restrict the height of the opening between the support walls of the outer, intermediate and inner mounting members and the lug means.

15. A recorder pen for a recording instrument comprising a tube having a chamber closed at one end, a writing nib carried by the tube and having a passageway therethrough communicating with the inside of said chamber, a fibrous means impregnated with fluid nested in said chamber with one end in intimate contact with said nib, plug means in the open end of said tube for closing said chamber, and mounting means carried by said tube for securing said pen on an arm, said mounting means comprising at least two spaced apart pairs of mounting members each pair of mounting members having a pair of support walls spaced from each other and from said tube to provide an arm entering opening between said support walls and said tube, at least one mounting member having web means extending into the opening between the tube and the support wall, and ridge means on said tube projecting into said opening between said support walls and said tube to restrict the height of said openings whereby an arm end will pierce a portion of said web means and is urged by said ridge means into contact with said support walls to hold said pen onto said arm.

16. A recorder pen for a recording instrument comprising a tube having a chamber closed on one end, a linear fiber writing nib carried by the tube in communication with the inside of said chamber, a writing fluid impregnated fibrous means is nested in said chamber, plug means embedded in the open end of said chamber for closing said chamber and for compacting said fibrous means against the end of said nib inside said chamber, ledge means in said chamber for limiting the inward movement of said plug means to restrict the amount of compacting of said fibrous means, mounting means carried by said tube for securing said pen on an arm, said mounting means comprising at least two longitudinally spaced apart pairs of mounting members having support walls spaced from said tube to provide arm entering openings therebetween, at least one of said mounting members having web means bridging the opening between said tube and the support wall of said mounting member, and ridge means on said tube and spaced from said support walls of one of said pairs of mounting members, said ridge means projecting into said opening between the tube and support walls to restrict the height of said openings, whereby an arm end pierces a portion of said web means and is urged by said ridge means into contact with said support walls on said mounting members to hold said pen onto said arm.

17. A recorder pen as claimed in claim 16 wherein lug means are formed on said tube between said pairs of support members to limit the height of the openings between the support walls and the tube and to assist the ridge means in urging the arm against the support walls.

18. A recorder pen for a recording instrument comprising a tube having a chamber closed on one end, a linear fiber writing nib carried by the tube in communication with the inside of said chamber, a writing fluid impregnated fibrous means nested in said chamber, plug means embedded in the open end of said chamber for closing said chamber and for compacting said fibrous means against the end of said nib inside said chamber, ledge means in said chamber for limiting the inward movement of said plug means to restrict the amount of compacting of said fibrous means, mounting means carried by said tube for securing said pen on an arm, said mounting means comprising at least two longitudinally spaced apart pairs of mounting members having support walls spaced from said tube to provide arm entering openings therebetween, at least one of said mounting members having web means in the opening between said tube and the support wall of said mounting member, and ridge means on said tube and spaced from said support walls of one of said pairs of mounting members, said ridge means projecting into said opening between the tube and support walls to restrict the height of said openings, whereby an arm end deflects a portion of said web means and is urged by said ridge means into contact with said support walls on said mounting members to hold said pen onto said arm.

19. A recorder pen for a recording instrument comprising a tube having a closed chamber, means for maintaining a supply of fluid in said chamber, a writing nib carried by the tube and communicating with the fluid in said chamber, and mounting means carried by said tube for securing said pen on an arm, said mounting means comprising three longitudinally spaced apart pairs of mounting members, each mounting member having a side wall and a support wall, said support walls of each pair of mounting members being spaced from each other and from said tube to provide an arm entering opening therebetween, each mounting member of the inner and outermost pairs of mounting members having web means bridging the opening between said tube, the side wall and the support wall of said mounting member, ridge means formed on said tube between the side walls of the outer and intermediate mounting members and projecting into said opening between said tube and the support walls to restrict the height of said openings, and lug means formed on said tube between the respective pairs of mounting members and projecting away from said tube to restrict the clearance between said tube and the support walls of said pairs of mounting members whereby an arm end pierces a portion of said web means and is urged by said ridge means and lug means into contact with said support walls to hold said pen onto said arm regardless of the width or thickness of said arm.

* * * * *